July 16, 1968 R. M. PETRUCCI 3,392,838
FILTER FOR FLUIDS
Filed May 4, 1966
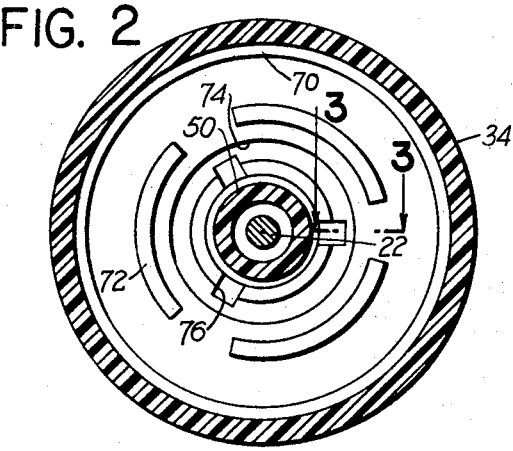
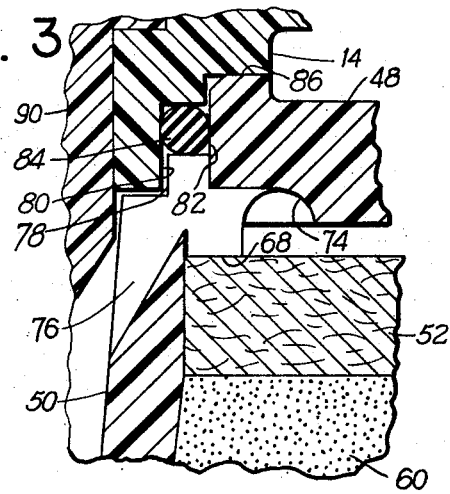
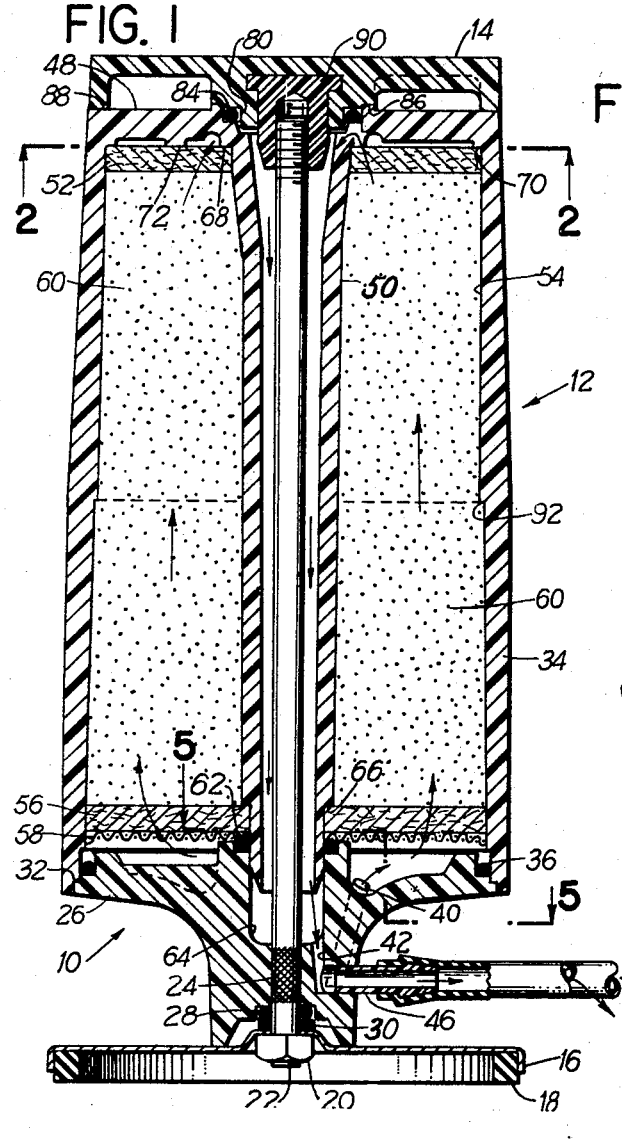
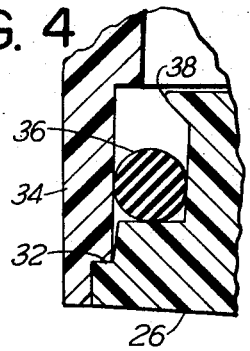
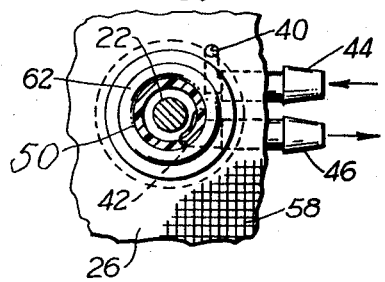
INVENTOR.
RAYMOND M. PETRUCCI
BY
Murray Schaffer
ATTORNEY 3,392,838
FILTER FOR FLUIDS
Raymond Mark Petrucci, Waterbury, Conn., assignor to American Machine & Foundry Company, a corporation of New Jersey
Filed May 4, 1966, Ser. No. 547,616
6 Claims. (Cl. 210—288)

The invention here disclosed is concerned with filtration and more particularly with relatively small filters suited for use in domestic water services for the removal of deleterious solids and obnoxious tastes and odors.

In general, goods of the subject class are "consumer items," that is, they are operated and most frequently installed by the user who is generally a householder without notable mechanical skill. Structures of the prior art have often been unfavorably regarded because of the need for permanent plumbing connections; in other cases the task of replacing expendable elements together with overall maintainence has proved troublesome. It is therefore an object of the invention to provide a rugged, simple and reliable device which is easy to install and maintain and in which the expendable elements may be replaced without appreciable skill.

It is a further object to provide a filter of the type in case, where the expendable portion may be assembled in only one way and which employs no sump or housing which might present difficulties in the matter of maintaining a satisfactory standard of cleanliness.

Still another object is to provide, in a filter employing granular media in its operating element, a simple and reliable means of preventing the occurrence of channeling in such media. How these and other objects may be attained will become apparent on perusal of the following specification and the appended drawings of which:

FIGURE 1 is a vertical center-line section of the whole device;

FIGURE 2 is a cross-sectional view taken on the line 2—2 of FIGURE 1;

FIGURE 3 is an enlarged fragmentary section of the portion indicated by line 3—3 of FIGURE 2;

FIGURE 4 is an enlarged fragmentary view of the lower left hand portion of FIGURE 1 at the junction of the pedestal and the filter body;

FIGURE 5 is a fragmentary view as seen from the line 5—5 of FIGURE 1.

The embodiment of the invention here disclosed is a small filter suited for use in a domestic water service and arranged for connection thereto by flexible tubes leading to a diverter valve of a known commercial type and attachable on a kitchen faucet. Such valves allow water to issue directly from the faucet or to be diverted to the filter and thence back to the faucet for issuance therefrom. Turning now to the drawings; as shown in FIGURE 1 the structure has three major components, the pedestal 10, the filter element 12 and a cover 14 which also serves as a nut to hold the parts together and as a sealing plug.

The pedestal 10 comprises an inverted shallow metallic cup 16 having an elastomeric ring 18 cemented in place as shown and serving as a pad on which the whole may stand. The center of the said cup is suitably formed for nesting engagement with a nut 20, which is threaded on to the center bolt 22; the said bolt extends through the element 12 and has threaded engagement with the cover 14. The bolt 22 is knurled at 26 for secure anchorage in the base 26 which is preferably of moulded synthetic resin and at its lower end carries an O ring 28 which seals between it and the bolt 22; a metallic spacer 30 rests on the cup 16 and hold the O ring 28 in place. The outer periphery of the base 26 is shaped to afford a shelf 32 on which the lip of the element shell 34 may rest, it also affords support for the O ring 36 which, as is clearly shown in FIGURE 4 is lodged, in sealing engagement, between the shell 34 and the base 26, just above the shelf 32; four small lips 38 are formed in the base 26 so as to protrude over the O ring 32 to prevent accidental loss when the filter is dismantled. The base 26 also has a pair of ducts 40 and 42 which together with hose spuds 44 and 46 afford ingress and egress for the water being filtered as will be later explained.

The filter element 12, comprises an outer shell 34 having an upper end wall 48 and a center tube 50, the whole being preferably a one-piece moulding of synthetic resin. A filter disc 52, which may conveniently be made of asbestos and cellulose fiberboard is suitably apertured and is a light press fit in the top of cavity 54 within the shell 34; assembly is facilitated by the moulding draft of the inner surface of the shell 34 and the taperd upper end of tube 50 affording clearance for the said disc until it is almost in place. A generally similar but larger filter disc 56 is lightly pressed in place adjacent the mouth of the shell 34 and is there retained by the disc 58 of wire mesh which has a central aperture and is cut somewhat larger in diameter than the inside diameter of shell 34; on being pressed into place the said disc 58 becomes cupped and its rough edges dig slightly into the wall of the shell and hold the filter discs 52 and 56 together with a tightly packed charge of activated carbon 60 in place. An O ring 62 is located on the center tube 50 contiguous to the wire mesh disc 58 to afford a seal between the said tube and a cavity 64 located in the base 26, the said tube has a shoulder 66 which serves to back up the discs 56 and 58; the lip of the cavity 64 is suitably counter-bored as shown in FIGURE 1 to contain the O ring 62. Inner and outer downwardly projecting rings or lands 68 and 70 respectively, together with the three ribs 72 serve to hold the filter disc 52 away from the under surface of wall 48 and afford a drainage area that also includes a groove 74 and three ports 76 which lead from the said groove to the interior of tube 50.

The upper end of the interior of tube 50 has a divergent taper terminating in a counterbore portion having a smaller diameter 78 affording a centralizing register for the hub 80 of cover 14 and immediately above this is a larger diameter portion 82 affording a nest for the O ring 84 which has sealing engagement with axially extending wall of portion 82 and the matching part of hub 80. The said wall of portion 82 protrudes slightly beyond the upper face of wall 48 and provides a radially disposed land 86 on which a mating surface of the cover 14 bears when the latter is screwed down to hold the assembly in the order shown in FIGURE 1. The cover 14 is so shaped that its outer lip 88 does not come into contact with the periphery of wall 48 until it, the cover, has been screwed down sufficiently to hold the parts securely together and to slightly dish the wall 48; when pheripheral contact is achieved it creates enough friction to prevent further hand tightening. This arrangement gives a signal that the parts have been adequately tightened while preventing destructive overtightening. In order to prevent unsightly shrink marks in cover 14, its central, internally threaded boss 90 is formed as a separate part, preferably of the same synthetic resin as the cover is made of, and is then moulded in place as an insert.

When the filter is in use, water to be purified flows in through hose spud 44, duct 40 and thence, as indicated by arrows in FIGURE 1, through the mesh disc 58, the filter disc 56, the charge of granular activated carbon 60 and the upper filter disc 52, it then passes through ports 76 to the interior of tube 50 and downwardly into the cavity 64 and on via duct 42 and hose spud 46 to the aforementioned diverter valve (not shown) or other point of exit as desired. It should be noted that a small and relatively sharp change in the inside diameter of shell 34 occurs at about mid-height. This affords a shoulder 92 which is effective in preventing channelling in the charge of activated carbon 60. The probable reason for this beneficial function of the shouler is the break-up of laminar flow over the inner surface of the shell. In any event, the end result is the avoidance of an old and persistent cause of trouble. It is intended that element 12 be replaced as a unit when its useful life is exhausted.

What I claim is:

1. A filter comprising an element and support means therefore, said element comprising:
    (a) a pressure retaining shell forming an outer tube open at one end and
    (b) an inner tube located within said outer tube and substantially parallel therewith and,
    (c) a transverse wall extending radially from one end of said outer tube to the proximate end of said inner tube,
    (d) the interior passage of said inner tube extending through said wall and being connected by a port with the interior of said outer tube,
    (e) fluid treating means surrounding said inner tube and extending radially thereof to the inner wall of said outer tube and extending axially of said tubes from adjacent said port to a point adjacent the open end of said outer tube,
    (f) a retainer engaging at least one of said tubes and retaining said fluid treating means within said outer tube;
said support means comprising a body having inlet and outlet ducts to direct the flow of fluid to and from said element and a surface whereat said ducts terminate, said surface being contoured for sealable engagement with the outer and inner tubes of said element, said support means further comprising a bolt retained by said body and adapted and arranged to pass within said inner tube to a point adjacent said wall for screw threaded engagement with a nut having a thrust face for thrusting contact with said element to urge the same toward said body.

2. The device according to claim 1 wherein:
    (a) said fluid treating means comprises a first filter disc, a quantity of odor absorbing material and a second filter disc arranged seratim within said shell with said first filter disc being located adjacent said wall and,
    (b) said retainer comprises a washer of foraminous material surrounding said inner tube and proportioned to have an edge in penetrating engagement with a surface of said shell when so positioned contiguous said second filter disc as to compact the components of said fluid treating means.

3. The device acording to claim 2 wherein said odor absorbing material comprises a mass of granular activated carbon and wherein said outer tube has a projection on its inner surface extending inwardly of part of said mass to prevent the formation of channels therein by fluid flowing through said filter.

4. A filter according to claim 3 wherein said outer tube, said inner tube and said transverse wall are moulded in one piece of synthetic resin and wherein said projection forms a shoulder around the inner surface of said outer tube.

5. A filter according to claim 4 wherein:
    (a) said thrust face contacts said element adjacent the junction of said inner tube with said transverse wall and
    (b) said nut extends radially of said thrust face to a surface adapted to contact an area of said element adjacent the junction of said outer tube and said wall and
    (c) the whole being characterized by the existence of a gap between said surface and said area when said thrust face has initial thrusting contact with said element and which gap is closed when said nut exerts sufficient force on said element to deform said wall toward said support whereby a noticable increase in fraction between said nut and said element is produced.

6. A filter according to claim 5 wherein:
    (a) said nut forms a shallow cup moulded of synthetic resin, having a rim and a central boss threaded for engagement with said bolt and having a cylindrical area for sealing engagement with an O ring situated in the mouth of said inner tube, the lip of said rim forming said surface of said nut for engaging said area and
    (b) O rings seal the engagement between said outer and inner tubes with said contoured surface and
    (c) the side of said wall within said shell is formed with a pattern affording a drainage space for the flow of liquid passing through said fluid treating means en route to said outlet duct via said port and said interior of said inner tube and
    (d) said support means further comprises a shallow metallic cup secured to said body by a nut having threaded engagement with the adjacent end of said bolt, said cup being oriented with its rim away from said body and having a resilient ring secured therein, said ring projecting axially of said cup to provide a non-skid surface.

References Cited
UNITED STATES PATENTS

| | | | | |
|---|---|---|---|---|
| 2,529,398 | 11/1950 | Krieck | 210—439 X |
| 2,661,846 | 12/1953 | Lash et al. | 210—439 |
| 2,738,879 | 3/1956 | Frantz | 210—439 |

SAMIH N. ZAHARNA, *Primary Examiner.*